3,574,152
PLASTIC MATERIALS COMPRISING TEA EXTRACTS RESIDUE AS FILLER
Eugenie Ligo, 38 Calcraft House, Bonner Road, London, England
No Drawing. Filed Aug. 13, 1969, Ser. No. 849,873
Claims priority, application Great Britain, Aug. 14, 1968, 38,935/68
Int. Cl. C08g 51/14
U.S. Cl. 260—6                                                14 Claims

ABSTRACT OF THE DISCLOSURE

Plastic materials comprise as filler the material tea flour which is the residue obtained after extraction of solubles from tea leaves and stalks reduced to dried powdered form.

BACKGROUND OF THE INVENTION

This invention is concerned with improvements in and relating to plastic materials.

There is an ever-increasing demand for various types of resin-filler compositions produced as general purpose moulding materials, timber substitutes, floor covering and the like. The resins mostly used are of the thermosetting type, e.g. phenol-formaldehyde, urea-formaldehyde and melamine formaldehyde resin, but thermoplastic resins, e.g. polyvinylchloride, are also used as bonding materials in many compositions, praticularly in floor cloth and the like. In the linoleum type of floor covering a hardened oil is used in conjunction with a natural resin used as a binding material. Typical examples of substances used as modifying fillers are wood flour, nylon fibre, glass fibre, asbestos fibre, mica and clays, as well as bagasse, straw, hemp, cork and nut shells.

Although various mineral fillers, such as slate flour or talc, can be used to obtain an improved surface finish where this is of importance, all of these materials have a relatively high specific gravity, which leads to disadvantages in their use. They are also non-fibrous and consequently impart very little mechanical reinforcement to the resin. As a general-purpose filler, wood flour has achieved a wide acceptance. However, surface finish of articles moulded from compositions containing it is, for certain applications, not always as good as desired and to meet this difficulty wood flour has been used in association with other fillers, e.g. walnut shell flour or coconut shell flour. However, these latter materials are comparatively expensive.

In view of the fact that the cost of the resin is usually the most expensive item in the production costs of a plastic material, a filler that is capable of acting as an extender of the resin, thus reducing the amount, and consequently the cost, of the resin-required to produce a given quantity of the final product, is highly desirable from the economic point of view.

Further, it is desirable, especially in the production of mouldings of large articles, that the moulding composition, e.g. phenol-formaldehyde resin composition, should have a high flow value. A high flow value is achievable by increasing the relative content of resin to filler but this is an expensive technique since it involves the use of more of the costly resin. There is thus a need for additives which will increase the flow value without requiring any increase in the resin content.

In the production of moulding composition from plastics materials it is often desirable to include in the moulding composition an ingredient which has some lubricating or plastcizing action, thereby to faclitate the moulding operation. However, the selection of a lubricant or plasticizing additive must be effected with great care since it must, inter alia be such that it does not form a bloom on the surface of the moulded article. It is therefore an advantage to have a filler with a self-contained lubricant producing a bloom-free surface finish. It is an object of the present invention to provide plastics compositions which comprise a novel filler ingredient, herein referred to for brevity as "tea flour."

"Tea flour" is the residue obtained following the extraction of soluble ingredients from tea leaves and stalks by drying and powdering such residue.

SUMMARY OF THE INVENTION

According to the present invention there are provided plastics compositions which comprise a plastics material and as a filler therefor, the material tea flour as just defined.

According to a further feature of the present invention there is provided a process for the production of a mouldable plastics composition which comprises incorporating in a mouldable material, the material tea flour.

According to a still further feature of the invention there are provided moulded products obtained by moulding of a mouldable plastics compositions as just defined.

DETAILED DESCRIPTION OF THE INVENTION

The material tea flour may be employed as an additive to plastics materials. Particularly suitable palstics compositions according to the present invention are the thermosetting condensation polymers known per se for the production of moulded products such as phenol-formaldehyde resins,, urea-formaldehyde resins and melamine-formaldehyde resins, and the thermoplastic polymers known per se for the production of moulded products such as polyvinyl chloride.

Other plastics materials which may be present in the compositions include carbohydrate types such as cellulosic materials as for instance, cellulose acetate, cellulose nitrate and cellulose acetobutyrate, ethyl cellulose, alginates and starch-formaldehyde condensation products, proteinaceous materials such as casein, synthetic linear polyamides such as the nylons and polyurethanes, synthetic linear polyesters such as alkyd resins, ethylene glycolterephthalic acid resins (e.g. Terylene), vinyl and vinylidene polymers and copolymers such as polyvinyl acetate, polyvinylidene chloride, polyvinyl acetals, acrylic polymers and copolymers such as polymethyl methacrylate, and copolymers including acrylonitrile residues, and organosilicone polymers.

As compared with the conventional use of wood flour, the material tea flour leads to important advantages. In particular it is found that it may successfully be incorporated in the compositions in proportions greater than is customary and satisfactory when using wood flour so that the resin content of the final product is relatively reduced, with considerable economic advantage. Further, it has been found that the use of tea flour affords to the moulded articles an improved surface finish. It also produces greater flowability during the moulding operation, which is a considerable advantage in the production of large and intricate mouldings. Other important advantages flow from the use of tea flour as hereinafter explained.

Tea extract residues have become readily available in bulk quantities in recent years by reason of the newly developed industry of manufacturing "instant tea." In this industry, the soluble ingredients of the tea are extracted and the residue of tea leaves etc. has hitherto been regarded as waste. It is accordingly a very cheap raw material. For use in the present invention the tea extract residues must first be dried, preferably to a moisture content of at most about 10% by weight and more preferably to a substantially lower moisture content e.g. 2–5%. To minimise the risk of fungal, bacterial or like attack by organisms, a fungicidal or bactericidal compound may be incorporated in the residue before it is dried down or sprayed onto the dried residue.

The dried residue must be pulverised to a powdery condition, preferably so that at least the bulk of it will pass a 100 BSS mesh. It should be stored in closed containers since it has some tendency to be hygroscopic.

Tea flour is a composite extender combining a reinforcing filler with a resin-forming material; it contains cellulosic material, proteinaceous material and minor ingredients such as starch, residual tannins, oil and waxes. It is believed that at least part of the advantages obtained by the use of tea flour flow from its quite substantial content of proteinaceous matter, which is considerably higher than that of the black tea leaf due to the fact that the proteins, which are insoluble in water, remain in the residues while the total mass of the tea is considerably decreased during the tea extraction process. This content may be of the order of 20–35% by weight of the dried material depending on the proportion of soluble matter extracted. Since it is well known that proteins will react with formaldehyde (e.g. in the well known casein-formaldehyde plastics materials) it is considered possible that when the tea flour is incorportaed in formaldehyde-containing plastics materials (e.g. phenol-formaldehyde, urea-formaldehyde or melamine-formaldehyde precondensates) some reaction with formaldehyde residues may take place. Therefore, in compositions based on aldehyde type resin incorporating tea flour it may be necessary to increase the proportion of the aldehyde in order to compensate for the deficiency thus caused, which may affect the cross linking of the thermosetting resin.

The proportion of tea flour used will depend on the nature of the plastics composition and its intended use. It may be present in only minor proportions or may be used in more substantial proportions e.g. up to 80% or even more by weight of the composition. Whilst the tea flour may be used as the sole filler it is also possible and in some cases desirable to use it in association with other fillers e.g. with wood flour or any other filler referred to above.

SPECIFIC EMBODIMENTS

The following examples will serve to illustrate the invention:

Example 1

This example illustrates the use of tea flour as filler compared with the use of wood flour.

A moulding composition A was prepared having the following composition in parts by weight:

| | Parts |
|---|---|
| Phenol-formaldehyde "Novolak" resin | 100 |
| Tea flour | 100 |

A comparison moulding composition B was prepared in which the tea flour was replaced by an equal weight of wood flour. These compositions were moulded and cured by heat and pressure. It was found that composition A had a substantially improved flowability, the actual figures being: Composition A: 17.2 cms.; Composition B: 15.5 cms.

Example 2

This example illustrates the use of tea flour as a partial replacement for the conventional wood flour, i.e. as an extender for the resin.

A composition was prepared as Composition B of Example 1.

A composition C was prepared as follows:

| | Parts |
|---|---|
| Phenol-formaldehyde resin | 100 |
| Wood flour | 50 |
| Tea flour | 80 |

The articles moulded from composition C were found, as compared with those of composition B, to have a greatly improved surface finish and a higher toughness and flexibility.

Example 3

A composition D was prepared comprising:

| | Parts |
|---|---|
| Melamine-formaldehyde resin syrup | 2 |
| Tea flour | 1 |
| A composition E was prepared comprising Melamine formaldehyde resin syrup (as above) | 3 |
| Wood flour | 1 |

Mouldings were made from these compositions and the moulding from Composition D was found to be tougher and more flexible.

Example 4

100 parts of tea flour were blended with 60 parts of di-n-butyl phthalate and the resulting paste was hot-compounded with 50 parts of plasticized polyvinyl chloride. The resulting composition was hot-pressed to sheet form. The sheets were tough, flexible and of a leather like nature, with a high gloss finish.

I claim as my invention:

1. A plastics composition comprising a plastics material and, as a filler therefor, dried and pulverised tea extract residues.

2. A composition according to claim 1 wherein the said filler has a moisture content below 5% by weight.

3. A composition according to claim 1 wherein the plastics material is a thermosetting resin.

4. A composition according to claim 3 wherein the plastics material is a phenol-formaldehyde resin.

5. A composition according to claim 3 wherein the plastics material is a urea-formaldehyde resin.

6. A composition according to claim 3 wherein the plastics material is a melamine-formaldehyde resin.

7. A composition according to claim 1 wherein the plastics material is a thermoplastic resin.

8. A composition according to claim 7 wherein the plastics material is a polyvinyl chloride.

9. A composition according to claim 1 wherein the filler includes both dried and pulverised tea extract residues and wood flour.

10. A moulded product formed of a composition comprising a mouldable plastics material and as a filler therefor, dried and pulverised tea extract residues.

11. A method for the production of a moulded product of improved surface finish, which comprises drying tea extract residues, pulversing the dried product and incorporating the dried and pulverised product in a mouldable plastic material as at least part of the filler therefor, and moulding the resulting composition.

12. A method according to claim 11 wherein the plastics material is a phenol-formaldehyde resin.

13. A method for improving the flowability of a moulding composition based on a mouldable plastics material and a filler which comprises drying tea extract residues, pulverising the dried product and incorporating the dried and pulverised product in the mouldable plastics material.

14. A method according to claim 13 wherein the plastics material is a phenol-formaldehyde resin.

References Cited
FOREIGN PATENTS

| | | | |
|---|---|---|---|
| 1,117,102 | 6/1968 | Great Britain | 99—77 |
| 1,111,979 | 5/1968 | Great Britain | 99—77 |

OTHER REFERENCES

Chem. Abst. 19313c (1959), Kursanov et al., "Extraction of Caffeine—Leaves."

Chem. Abst. 54: 25,526a, Subramanian, "Insecticidal—Fluff."

Chem. Abst. 56: 5004i, George, "Complete Utilization of Coconut Husk."

Chem. Abst. 60: 121.83c, Jain et al., "Plywood—Wastes."

Chem. Abst. 66: 18143w, 1967 Bokuchava et al., "Production—P Content."

Tea Manufacture, C. R. Harler, T.P. 650 H3, pp. 10–12, 76–78 and 107–114.

HAROLD D. ANDERSON, Primary Examiner

E. WOODBERRY, Assistant Examiner

U.S. Cl. X.R.

106—288; 260—6, 7, 7.5, 8, 17.2, 17.3, 17.4